United States Patent
Vilkuna et al.

(10) Patent No.: US 7,289,762 B2
(45) Date of Patent: Oct. 30, 2007

(54) METHOD FOR PERFORMING AN INQUIRY IN A TELECOMMUNICATIONS NETWORK

(75) Inventors: Kirsti Vilkuna, Jyväskylä (FI); Sami Johansson, Jyväskylä (FI)

(73) Assignee: Nokia Corporation, Espoo (FI)

( * ) Notice: Subject to any disclaimer, the term of this patent is extended or adjusted under 35 U.S.C. 154(b) by 570 days.

(21) Appl. No.: 10/381,711

(22) PCT Filed: Oct. 18, 2001

(86) PCT No.: PCT/FI01/00905

§ 371 (c)(1),
(2), (4) Date: Mar. 26, 2003

(87) PCT Pub. No.: WO02/33991

PCT Pub. Date: Apr. 25, 2002

(65) Prior Publication Data

US 2004/0097247 A1    May 20, 2004

(30) Foreign Application Priority Data

Oct. 18, 2000 (FI) .................................. 20002299
Mar. 23, 2001 (FI) .................................. 20010597

(51) Int. Cl.
*H04H 9/00* (2006.01)

(52) U.S. Cl. .................. 455/2.01; 455/466; 455/3.01; 455/419

(58) Field of Classification Search .............. 455/2.01, 455/3.01, 3.03, 3.05, 466, 412.1, 412.2, 414.1, 455/414.4, 456.1, 456.2, 419, 418, 452.1, 455/450; 705/10, 1, 7; 379/92.04, 92.02, 379/92.01

See application file for complete search history.

(56) References Cited

U.S. PATENT DOCUMENTS

| | | | |
|---|---|---|---|
| 6,324,266 B1 * | 11/2001 | Mannings | 379/92.04 |
| 6,513,014 B1 * | 1/2003 | Walker et al. | 705/10 |
| 6,754,635 B1 * | 6/2004 | Hamlin et al. | 705/10 |
| 6,873,688 B1 * | 3/2005 | Aarnio | 379/92.02 |

FOREIGN PATENT DOCUMENTS

| | | | |
|---|---|---|---|
| WO | 9809451 | | 3/1998 |
| WO | WO 98/09451 | * | 3/1998 |
| WO | 0041415 | | 7/2000 |
| WO | WO 00/41415 | * | 7/2000 |

* cited by examiner

*Primary Examiner*—Edward F. Urban
*Assistant Examiner*—John J. Lee
(74) *Attorney, Agent, or Firm*—Hollingsworth & Funk, LLC

(57) ABSTRACT

The invention concerns a method for performing an inquiry in a telecommunications network, in which the inquiry is carried out in the following steps: —creating a database of persons, —forming and recording the questions, —selecting from the database a set satisfying desired conditions, —sending the inquiry in the form of text messages (SMS, Short Message Service) to the persons included in the set, —receiving text message replies for a predetermined length of time, —storing and interpreting each reply, so that, according to each set criterion, the question arranged to be the next one is sent to the same person, —generating a report.

2 Claims, 3 Drawing Sheets

METHOD FOR PERFORMING AN INQUIRY IN A TELECOMMUNICATIONS NETWORK

TECHNICAL FIELD

The present invention relates to a method for performing an inquiry in a telecommunications network, in which method the inquiry is carried out in the following steps:
creating a database of persons,
forming and recording the questions,
selecting from the database a set satisfying desired conditions,
sending the inquiry to the persons included in the set,
receiving replies for a predetermined length of time,
storing and interpreting each reply,
generating a report.

BACKGROUND OF THE INVENTION

At present, inquiries are performed either by mailing a questionnaire and receiving replies or via an interactive interview (e.g. by telephone or face to face). Handling and analyzing the replies manually takes up an unreasonable amount of labor resources and/or time.

The international patent proceeding WO98/09451 has presented a Gallup poll method based on text message inquiries. In this method the inquiry is sent in the form of an SMS message essentially simultaneously to the communication stations of two separate recipients via a service center that utilizes wireless data transfer. Then the recipients enter their replies into the inquiry message and send a reply message in the form of an SMS message back to the data system of the sender, in which it is processed in a predetermined way.

SUMMARY OF THE INVENTION

An object of the present invention is to achieve an improved method for performing an inquiry using SMS messages. The features characteristic of the method of the invention are presented in a method for performing an inquiry wirelessly in a telecommunications network, in which the inquiry is carried out in the following steps:
creating a database of persons with demographic data,
forming and storing the questions,
transcribing the questions into SMS messages according to the specifications of a telecommunications network applicable in SMS (Short Message Service) communication,
selecting from the database a set satisfying desired demographic conditions,
sending the formed SMS message via the telecommunications network to the persons included in the set,
receiving replies via the SMS message service for a predetermined length of time,
storing and interpreting each reply,
generating a report, and is characterized in that each reply is interpreted and, according to a each set criterion the question arranged to be the next one is sent to the same person.

When an inquiry is performed in a telecommunications network by the method of the invention, considerable advantages will be achieved. In addition to the fact that the questions can be sent and received by a software-controlled technique using an SMS (Short Message Service) communications network, the progress of the inquiry for the part of each respondent can be controlled in accordance with a set criterion. Preferably, the results of the inquiry are produced and updated on a display device in real time, expressly as an HTML page, which is easy to monitor via the information network.

In the following, the method will be described with reference to the attached drawings illustrating the method and giving a functional block diagram of it.

DETAILED DESCRIPTION OF THE INVENTION

Figure 1:
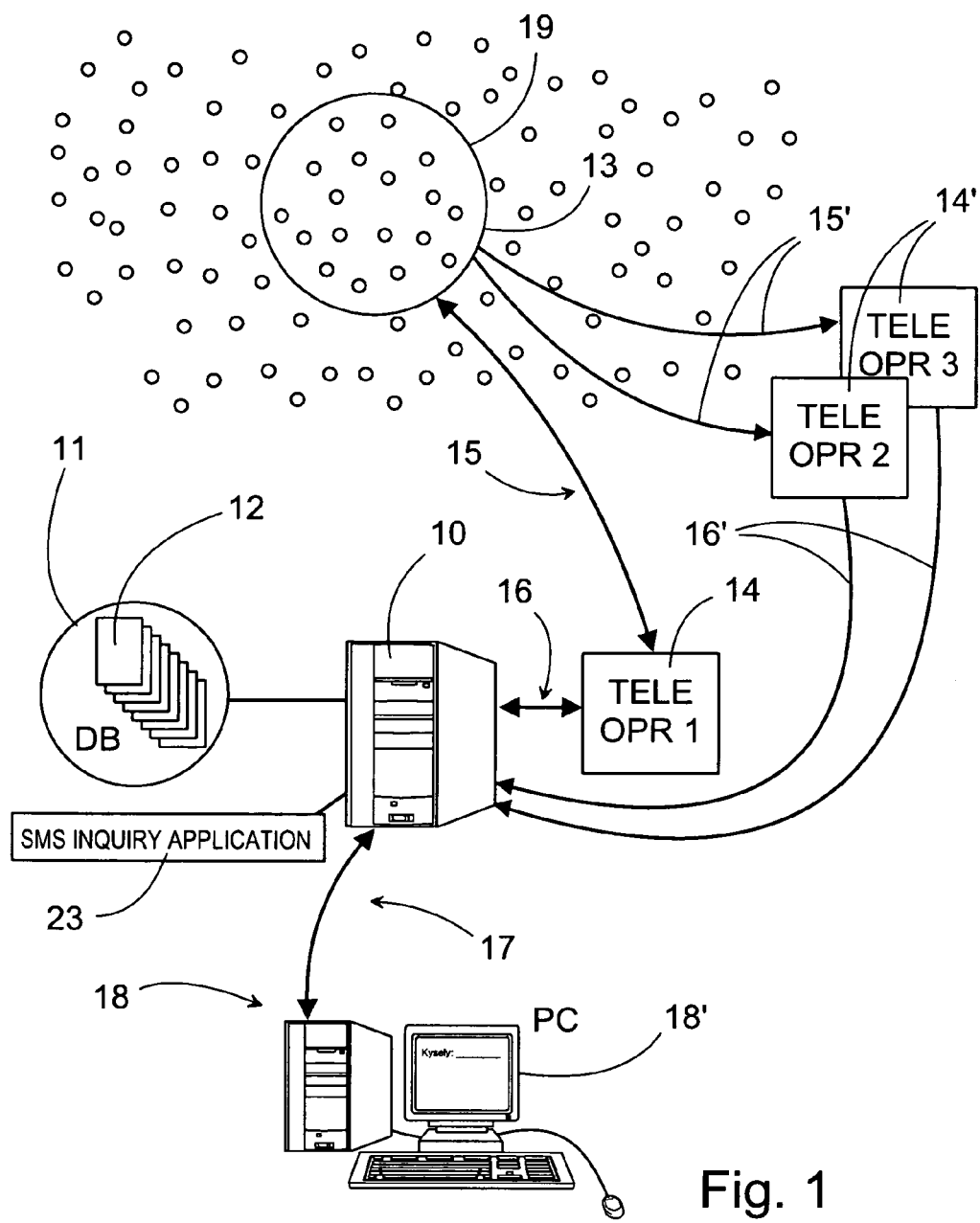
FIG. 1 is a diagram illustrating the method.

In FIG. 1, a server 10 is used to maintain a database 11 consisting of information relating to persons 12, including SMS communication address data (generally a mobile telephone number). The server is also used to run an SMS inquiry application 23. Via channels 16 and 17, the server 10 communicates both with a telecommunications operator 14 and with a workstation 18 controlling the server via remote operation. Using SMS techniques 15, the telecommunications operator 14 communicates with a person 19 belonging to a subset 13 formed from the database on the basis of certain conditions.

The service uses preferably several telecommunications operators 14'. Each of these operators, utilizing SMS techniques 15', is in contact with his own subscribers and via channels 16' with the server 10.

The system provides the respondent preferably with a free SMS number. A service has been ordered from each telecommunications operator, in which the text messages sent to the same reply number are sent to the server 10 via the said channels 16 and 16'.

The text messages received by each telecommunications operator are sent (channels 16, 16') to a chosen IP address (IP=Internet Protocol) on the Internet, this IP address being the above-mentioned server 10, on which the received text messages are transferred into the database with a special application. For example the Finnish operator SONERA offers a service like this under the name of "Content Gateway". It includes a software installed on the server, which communicates with the text message center, and on the other hand is connected with the chosen database via AP interface. A corresponding service is ordered from each operator. In this case the "Content Gateway" software stores the text messages on the server as files, which are brought into the database by another application at fixed intervals. The database is utilized by a statistical application, which is now able to present the results of the inquiry e.g. in a real-time bar chart.

Preferably the real-time application is formed on the HTTP server connected with the Internet or the Extranet, which can naturally be the above-mentioned server 10. The graphic bar chart is realized simply as an HTML page, on which the height of the bars is determined by the updated data. An HTML page like this can easily be monitored throughout the whole information network with the help of browsers. The user downloads the page manually at fixed intervals. When desired an automatic updating, the page may be provided with an update command (REFRESH), which updates the page automatically.

Figure 2:
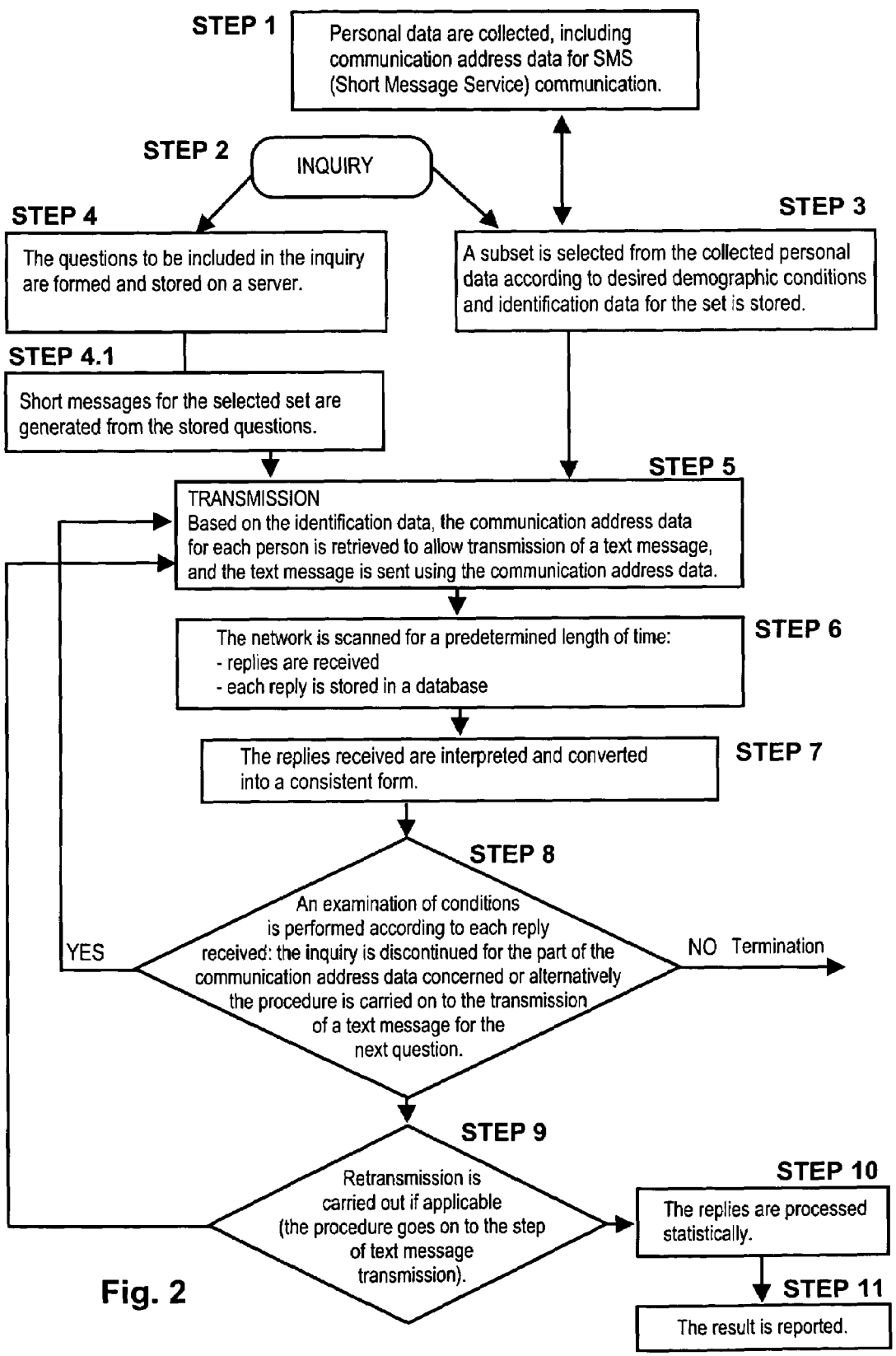
FIG. 2 presents a functional block diagram of the method.

The action of the invention represented by the block diagram in FIG. 2 is as follows. In step 1, a database of information relating to persons, including communication address data 11, is created on the server 10 to allow SMS communication. Step 2 starts the inquiry, and at first steps 3 and 4 are executed concurrently. In step 3, a subset satisfying desired demographic conditions is selected from the database, and the identification data relating to this subset are stored on the server 10. In step 4, the questions to be presented in the inquiry are generated and stored on the server 10. From the questions, text messages for the selected set 13 are formed and stored on the server 10 in step 4.1 and, based on the identification data, the communication address data for each person is retrieved for the transmission of the text message. In step 5, the text messages are transmitted by the telecommunications operator 14 over the SMS communication network 15 to each person.

The person 19 belonging to the subset 13 receives in his communication station an unambiguous question and alternatives for a reply (e.g. "Yes" or "No") to it, together with a reply address to which the reply is to be sent. The reply address is generally the sender's (server's) telephone number, making it possible to utilize the fast conventional "Reply to Sender" text message function. In step 6, the server 10 receives replies from the subset 13 for a predetermined length of time and sends them further to the SMS inquiry application 23, which will interpret them and store them in the database 11. In step 7, the SMS inquiry application converts the received replies into an unambiguous form (e.g. Yes, Y=>"1"), and in step 8 an examination of conditions is performed in accordance with a set criterion. For example, if the reply so requires, the inquiry is discontinued for the part of the communication address data in question or alternatively the procedure is carried on to step 5, transmission of a text message, for the next question. According to step 9, the system remains waiting for replies from the persons fro a predetermined length of time, whereupon the question can be sent again to persons who did not reply (second criterion).

The progress of the inquiry and the results produced can be monitored in real time during the inquiry via the display device 18' of a remotely operated workstation 18. In steps 10 and 11, a statistical report is generated from the stored replies as a continuous function during the inquiry or after its completion. Real-time monitoring of the results provides the possibility to end the inquiry at a desired point.

Future third-generation telecommunications networks will probably allow the use of some other short message system instead of the SMS.

Figure 3:
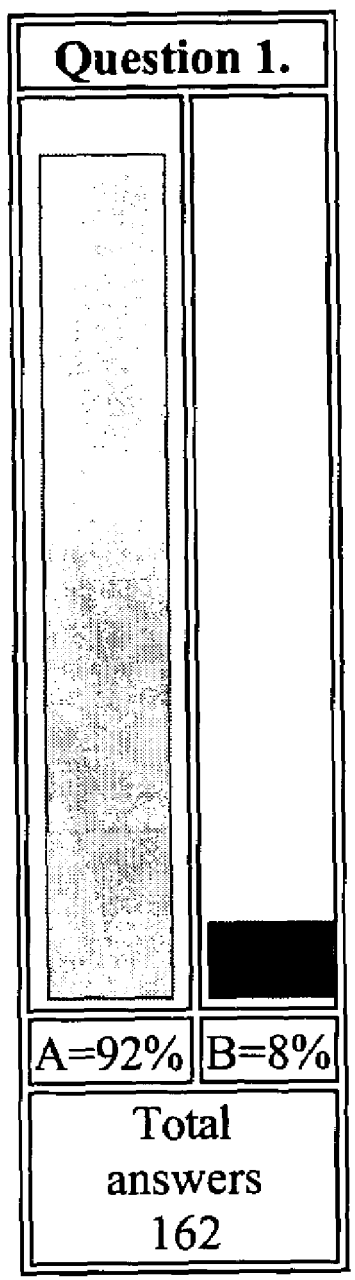
FIG. 3 presents the real-time result of an inquiry.

The next example presents the HTML (hypertext markup language) code used for a graphic presentation. This graphic presentation can be applied both in a one-phase and a multi-phased inquiry. The height ("HEIGHT=276" and "HEIGHT=24") of the bars on the HTML page and the total amount of the respondents ("Total answers 162") are parameters, which are changed when updating the page. The size of the page is so minimal that it is very quickly updated by the server 10 handling the inquiry(or the same server). The code of the page includes an update command, which allows the viewer's browser to download the page every five minutes. FIG. 3 presents an example of a printout produced by this code.

```
<HTML>
<HEAD>
<META HTTP-EQUIV="Refresh"
CONTENT="300;URL=http://wwwv.mobilemirror.fi/tulos-demo/output.html">
<TITLE>Inquiry results</TITLE>
</HEAD>
<BODY BGCOLOR=#ffffff>
<CENTER>
<TABLE BORDER=1>
<TR>
<TH COLSPAN=2 ALIGN=center>Question 1.</TH>
</TR>
<TR ALIGN=center>
<TD HEIGHT=300 VALIGN=bottom><IMG SRC=green.jpg WIDTH=40 HEIGHT=276 ALT="A 92%">
<TD HEIGHT=300 VALIGN=bottom><IMG SRC=red.jpg WIDTH=40 HEIGHT=24 ALT="B 8%">
</TR>
<TR>
<TD>A=92%</TD>
<TD>B=8%</TD>
</TR>
<TR ALIGN=center>
<TD COLSPAN=2>
Total</BR>
answers</BR>
162
</TD>
</TR>
</TABLE>
<CENTER>
</BODY>
```

Although the invention has been described by reference to a specific embodiment, it should be understood that numerous changes may be made within the spirit and scope of the inventive concepts described. Accordingly, it is intended that the invention not be limited to the described embodiment, but that it have the full scope defined by the language of the following claims.

The invention claimed is:

1. A system for performing an inquiry wirelessly in a telecommunications network, in which the system comprises:
   one or more telecommunications operators, each having subscribers with SMS connection;
   a server having a database of persons and demographic data relating to each person;
   one or more first communication channels on the Internet, each channel being between the server and one of the one or more telecommunications operators;
   a workstation for controlling the server via remote operation and for forming questions and storing them in the server;
   a second communication channel between the workstation and the server;
   means for transcribing the questions into formed SMS messages in the server and for selecting from the database a set satisfying desired demographic conditions;
   an SMS inquiry application in the server configured to send the formed SMS messages via the telecommunications network to the persons included in the set, receive replies via the SMS message service for a predetermined length of time, store and interpret each reply and generate a report, and send a next question as a SMS message to the same persons according to a set criterion regarding the received replies.

2. The system according to claim 1, wherein the system further comprises means for generating results as a continuous function and means for real time monitoring of the results.

* * * * *

UNITED STATES PATENT AND TRADEMARK OFFICE
CERTIFICATE OF CORRECTION

| | |
|---|---|
| PATENT NO. | : 7,289,762 B2 |
| APPLICATION NO. | : 10/381711 |
| DATED | : October 30, 2007 |
| INVENTOR(S) | : Vilkuna et al. |

It is certified that error appears in the above-identified patent and that said Letters Patent is hereby corrected as shown below:

Col. 3, line 34: "from the persons fro a predetermined" should read --from the persons for a predetermined--.

Signed and Sealed this

Fifteenth Day of April, 2008

JON W. DUDAS
*Director of the United States Patent and Trademark Office*